: 3,405,056
HYDROCRACKING PROCESS USING A MODIFIED ZEOLITE CATALYST AT LOW H₂S CONCENTRATIONS

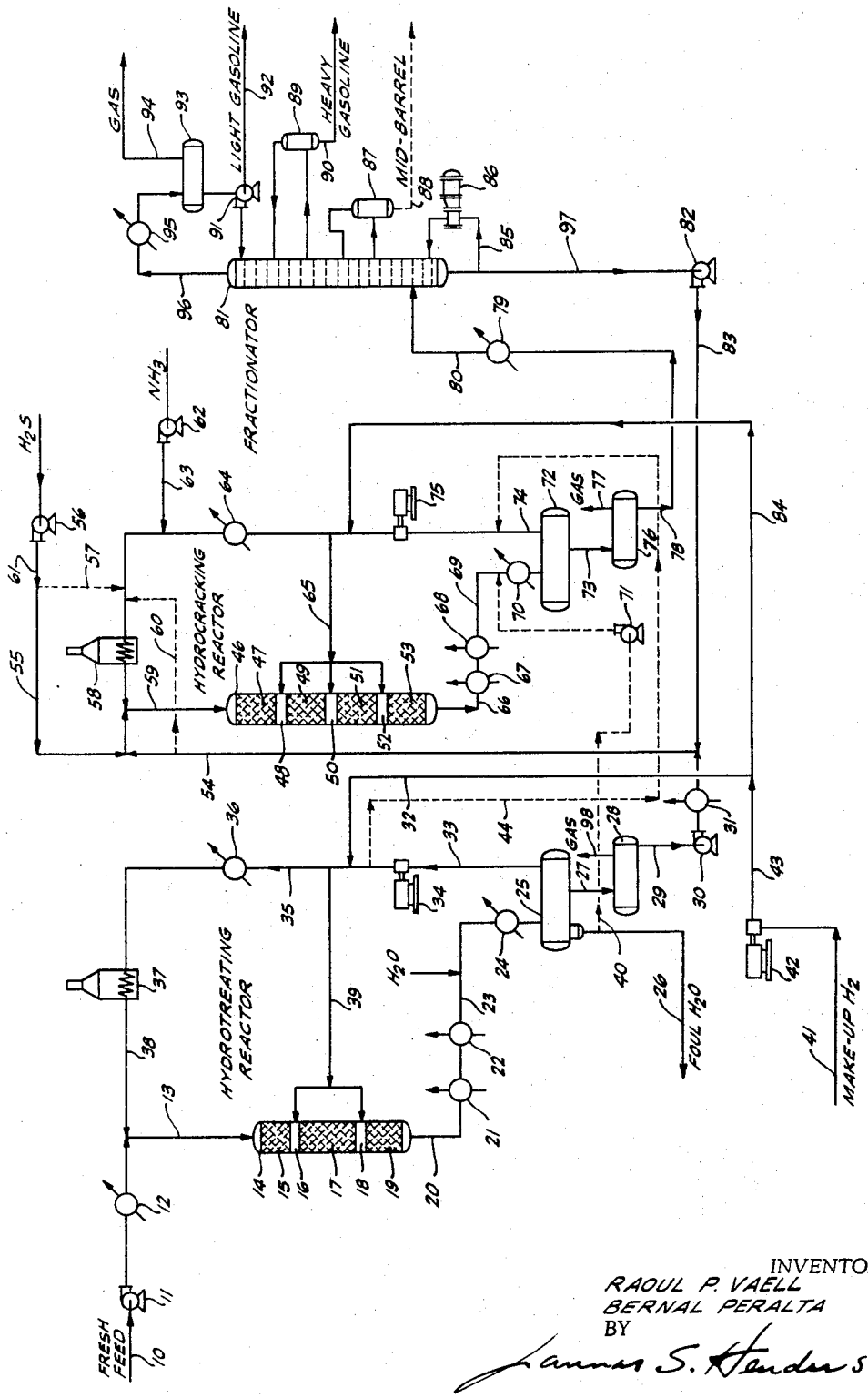

Raoul P. Vaell, Los Angeles, and Bernal Peralta, Fullerton, Calif., assignors to Union Oil Company of California, Los Angeles, Calif., a corporation of California
Filed Mar. 20, 1967, Ser. No. 624,452
14 Claims. (Cl. 208—111)

ABSTRACT OF THE DISCLOSURE

A process is disclosed for the production of gasoline by the catalytic hydrocracking of hydrocarbons using Group VIII noble metal-zeolite catalysts which have been partially deactivated by coking, and wherein optimum gasoline yields and quality are obtained by maintaining certain minimal concentrations of ammonia and hydrogen sulfide in the hydrocracking zone.

Background and summary of the invention

This invention relates to the artificial modification of a hydrocracking catalyst normally used under relatively "sour" hydrocracking conditions for the production of an aromatic gasoline product, to a catalyst suitable for use under relaitvely "sweet" hydrocracking conditions. More particularly, this invention relates to a method of artificially modifying a crystalline zeolite catalyst containing a Group VIII noble metal for use in a low $H_2S$ hydrocracking operation and to a process of hydrocracking therewith under low $H_2S$, or relatively "sweet," hydrocracking conditions, while still producing a high quality gasoline product.

The use of crystalline siliceous zeolite catalysts, or molecular sieves containing a Group VIII noble metal in the catalytic hydrocracking of petroleum fractions, as described for example in U.S. Patent No. 3,132,090 to Helfrey et al., results in a number of advantages which make them particularly desirable for commercial operations. A principal advantage of hydrocracking with such catalysts is the long run length attainable, e.g. two years and longer, before regeneration is required. Another important advantage is the high octane potential of such an operation when operated in the presence of hydrogen sulfide, whereby high octane levels may be maintained at high temperatures. Other advantages lie in the high gasoline yields obtained and in the low over-all hydrogen consumption required. In addition, hydrocracking plants designed for operation with molecular sieve-type catalysts may be maintained at relatively high liquid hourly space velocities, e.g. 0.8 to 10, and consequently require only relatively small size reactors, thus adding to the overall economic advantage of such units.

In view of the above advantages in the use of crystalline zeolite catalysts for hydrocracking operations, it frequently becomes necessary or desirable to convert a hydrocracking plant designed for operation with other types of hydrocracking catalysts to one which is adaptable for use with a crystalline zeolite catalyst containing a platinum group metal. A major obstacle to such conversion lies in the fact that a number of such plants are designed with low alloy reactors, e.g. low chrome-steel, which dictate a catalytic hydrocracking operation at relatively low $H_2S$ levels, for example, less than about 0.3 p.s.i. partial pressure of $H_2S$, to preclude corrosion. However, the hydrogenation activity of a fresh crystalline zeolite hydrocracking catalyst containing a platinum group metal, of the type most advantageously used in high alloy plants which may operate under relatively "sour" conditions, is too high for use in low alloy plants operating under relatively "sweet" conditions, and its use results in undesirable saturation of high-octane aromatics in the gasoline, yielding a product low in aromaitcs and gasoline octane. It is particularly advantageous, therefore, to produce a hydrocracking catalyst which possesses the highly desirable characteristics of crystalline zeolite hydrocracking catalysts and whose hydrogenation activity even in the fresh state is such that from the start of a run a high quality gasoline product is obtained, even when used in a low alloy plant under relatively low $H_2S$ conditions.

It has now been found that a hydrocracking catalyst suitable for use under low $H_2S$ conditions may be prepared artificially by subjecting the catalyst to an accelerated coking pretreatment by contact with a hydrocarbon feedstock at elevated temperatures, to deposit thereon about 2–30% by weight of non-volatile coke. The resulting precoked catalyst is then employed in a hydrocracking reaciton zone wherein certain critical small proportions of ammonia and $H_2S$ are maintained, sufficient to attain the desired product quality and yield distribution, as will be explained hereinafter.

The use of such artificially modified catalyst in a hydrocracking operation as described results in the simultaneous attainment of a marked improvement in the yield distribution and hydrogen consumption, as well as in the ability to maintain a high $C_5$–$C_6$ octane level. Quite unexpectedly, the use in conjunction with the pre-coked catalyst of small amounts of both ammonia and $H_2S$ results in a synergistic effect in that the gain in efficiency, as best measured by the $C_5$+ yield, exceeds the incremental gain obtained with the use of the equivalent amount of either $H_2S$ or ammonia alone, and exceeds the maximum gain obtainable with either one alone when used in even greater amounts under the sweet hydrocracking condition limits. Furthermore, in order to concurrently obtain the advantage of maintaining a high $C_5$–$C_6$ octane level while obtaining a maximum increase in $C_5$+ yield, it is necessary that both ammonia and $H_2S$ be added. The addition of ammonia alone increases the $C_5$+ yield to a moderate extent but results in degradaiton of the $C_5$–$C_6$ octane level; the addition of $H_2S$ alone maintains the $C_5$–$C_6$ octane level but again results in only a moderate increase in $C_5$+ yield. But the addiiton of both ammonia and $H_2S$ results in a maximum gain in $C_5$+ yield while the $C_5$–$C_6$ octane level is maintained. A synergistic effect is also obtained with the addition of both ammonia and $H_2S$, compared to the gain obtained with the addition of either one, with respect to the gain in "after reforming yield." "After reforming yield" is a measure of the total pool gasoline yield after reforming the 185–400° F. cut at sufficient severity to make 100 octane pool gasoline ($RON$+3 ml. TEL), blending back all $C_5$—185° F. hydrocracked gasoline and adding sufficient n-butane to give a Reid vapor pressure of 10 p.s.i. on the total blend.

Detailed description

The catalysts of this invention comprise a zeolitic molecular sieve cracking base combined with a minor proportion of a Group VIII noble metal hydrogenating promoter. More specifically, the zeolite cracking base is selected from a special class of zeolitic alumino-silicates composed usually of silica, alumina, and one or more exchangeable zeolitic cations such as sodium, hydrogen, magnesium, calcium and rare earth metal cations, such as cerium, lantanum, neodymium, praseodymium, etc. They are further characterized by crystal pores of relatively uniform diameter, between about 6 and 14A. Several crystal forms of such molecular sieves are now available and suitable for use herein e.g. those of the Y or L crystal types. It is preferred to employ zeolites having a relatively high $SiO_2/Al_2O_3$ mole-ratio, between about 3 and 10, more preferably between about 4 and 8. In particular, the Y zeolites having crystal pore diameters of about 9 to 10A, and wherein the $SiO_2/Al_2O_3$ ratio is about 4–6 are preferred. The hydrogenating promoter may comprise any one or more of the noble metals of Group VIII, their oxides or sulfides. Platinum and palladium are preferred.

Suitable synthetic zeolites for use herein are more particularly described in U.S. Patent No. 3,130,006. The preferred zeolite is designated therein as the Y crystal type, but the L crystal type described therein is also contemplated. The X type zeolites, described for example in U.S. Patent No. 2,882,244, have a $SiO_2/Al_2O_3$ ratio of only about 2.5 and cannot be appreciably decationized without destroying their crystal structure, but such zeolites may be stabilized with rare earth metals as described for example in U.S. Patent No. 3,140,253, and their use is also contemplated. Natural zeolites such as faujasite, mordenite, erionite and chabazite may also be employed.

The preferred "decationized" or hydrogen forms of the Y zeolite may be prepared by ion-exchanging the original alkali metal cations with ammonium ions or other easily decomposable cations, such as methyl substituted quaternary ammonium ions, and then heating to e.g. 300°–400° C., to drive off ammonia, as is more particularly described in U.S. Patent No. 3,130,006. The degree of decationization, or hydrogen exchange, should be at least about 20% and preferably at least about 40% of the maximum theoretically possible.

Mixed hydrogen–polyvalent metal forms of the Y zeolite are also contemplated. Generally such mixed forms are prepared by subjecting the ammonium zeolite to a partial back-exchange with polyvalent metal salt solutions. The resulting polyvalent metal-ammonium zeolite may then be heated at e.g. 400–900° F. to prepare the polyvalent metal-hydrogen form. It is preferred that at least about 20% of the monovalent metal cations be replaced with hydrogen ions. It is further preferred that at least about 10% of the monovalent metal cations be replaced by polyvalent metal ions, e.g. magnesium, calcium, zinc or the like, since this has been found to improve the hydrolytic stability of the resulting catalysts. A still further preference to be observed for maximum activity is that not more than about 20% of the original monovalent metal cations (3% by weight of $Na_2O$) shall remain in the catalyst.

Stabilization with rare earth metals is also contemplated. The benefits derived from such stabilization are particularly observed with respect to an X type zeolite which, as noted in U.S. Patent 2,882,244, collapses to an amorphous material and loses its internal pore system and practically all of its X-ray identification when subjected to substantial decationization in the conventional manner. Stabilization with rare earth metals may be achieved by the introduction of about 1.5 to 2.0 equivalents of stabilizing metal cations per mole of $Al_2O_3$, in the case of low-silica X type sieves, while relatively smaller amounts of rare earth metals are effective in the stabilization of high-silica Y molecular sieves. Rare earth metal cations may be introduced by back exchanging the ammonium form of the zeolite with a rare earth metal salt solution such as an aqueous rare earth chloride, at ambient temperatures or elevated temperatures at a pH of about 3 to 10, as described for example in U.S. Patent No. 3,140,253.

Hydrogenation activity is imparted to the zeolitic cracking base by adding a minor proportion, e.g. 0.01–3 weight percent, of a Group VIII noble metal. Specifically it is preferred to employ about 0.1% to 2% by weight of palladium, platinum, rhodium, or iridium. These metals may be added by impregnation of the powdered or pelleted zeolite, but preferably they are added by ion exchange to the powdered zeolite during, or directly after, the addition of ammonium and/or polyvalent metal ions, i.e. before the ammonium zeolite is decomposed to form the hydrogen zeolite.

The catalyst powders prepared as above described are then compressed or extruded into pellets of the desired size, generally ranging between about 1/16″ and 3/8″. Suitable binders or lubricants such as hydrogenated corn oil, graphite and the like may also be added. In addition, the catalyst powders may also be admixed with various inorganic, porous, powdered adjuvants which (1) are chemically stable at temperatures up to about 1,200° F., (2) are inert with respect to the catalyst component, and (3) have an average pore diameter greater than about 20 A., preferably 50–150 A. These adjuvants may be used in any desired proportion ranging between about 10% and 90% by weight of the total composition. The optimum proportion of adjuvant depends upon several factors, principally the relative activity of the catalyst component and its particle size. Small microcrystalline zeolites having high intrinsic catalytic activity tend to produce diffusion-limited pellets, and in these cases a substantially greater efficiency of catalyst utilization is obtained by copelleting the zeolite catalyst with the relatively inert adjuvants.

Suitable adjuvants include, for example, activated alumina, silica gel, silica-alumina cogels, magnesia, titania, zirconia, clays (preferably acid washed), rare earth oxides, chromium oxides, and the like. These materials may either be employed as such, or a minor proportion of a group VI-B or Group VIII metal hydrogenating component may be impregnated thereon.

In the pressure copelleting of the powdered zeolitic catalyst it is important that the pressure be low enough to leave a substantial volume of macro-pores having a diameter greater than about 20 A. Specifically, it is preferred that the final catalyst pellets comprise at least about 5% by volume of macro-pores in the 200–1,000 A. diameter range, as measured by the mercury porosimeter method described in Industrial and Engineering Chemistry, Volume 41, page 780 (1949), or by the nitrogen isotherm method as described in J.A.C.S., Volume 73, page 373 (1951). Porosity may also be specified more qualitatively in terms of the bulk density of the pelleted catalyst; bulk densities of 0.5–1.0 gms./ml. are preferred.

The pelleted catalyst composition is finally subjected to a calcining and activation treatment by heating in air at temperatures of e.g. 700–1300° F. for one-half to several hours. This calcination dehydrates the catalyst, converts the zeolitic ammonium ions to hydrogen ions, and stabilizes the metal component by oxidation.

The catalysts described above, after reduction with hydrogen, possess a high hydrogenation activity in their fresh state which renders them unsuitable for use in low-alloy plants operating under relatively sweet conditions. The absence of sulfur results in undesirable saturation of the high-octane aromatics in the gasoline to yield a product of low anti-knock quality. The catalyst may be preconditioned and used in low-alloy hydrocracking plants in accordance with this invention by first subjecting the oxidized catalyst to a prereduction treatment with hydrogen at elevated temperatures of e.g. about 500°–100° F. and pressures ranging up to about 2000 p.s.i., and then subjecting the reduced catalyst to coking at elevated cracking temperatures in contact with a siutable hydrocarbon oil for a period of time sufficient to deposit about 2–30 weight-percent of non-volatile coke on the catalyst. The resulting catalyst is then normally substantially inactive for hydrocracking at temperatures below about 600° F. "Substantially inactive" is defined as meaning that less than about 20 volt-percent conversion of a sulfur- and nitrogen-free gas oil to gasoline is obtained at 3.0 LHSV, 1500 p.s.ig. and 8,000 s.c.f./b. of hydrogen.

The resulting precoked cataylst is then employed for hydrocracking a mineral oil feedstock in the presence of hydrogen and certain minimal proportions of hydrogen sulfide and ammonia, sufficient to maintain in the hydrocracking zone a hydrogen sulfide partial pressure of about 0.015–0.35, preferably 0.045–0,2 p.s.i., and an ammonia partial pressure of about 0.015–15, preferably about 0.1–

0.6 p.s.i. The ammonia and hydrogen sulfide may be added as such, or in the form of suitable precursors such as tert-butylamine, thiophene, mercaptans, etc.

The prereduction treatment is critical when the catalyst is initially in an oxidized state, and effects more than a mere drying thereof. Omission of the reduction treatment results in agglomeration of the noble metal, with a consequent irreversible loss in activity of the catalyst. Prereduction is preferably carried out by gradually heating the catalyst to a temperature ranging up to about 1000° F., at a pressure ranging from about 100 p.s.i. to about 2000 p.s.i. in the presence of a flowing stream of hydrogen-containing gas. It is important that the temperature be raised slowly, preferably at a rate not exceeding 50° F. per hour until about 350° F. is reached and thereafter at a rate not exceeding 25° F. per hour, so that undesirable concentrations of water vapor do not build up in the catalyst bed. Heating at maximum temperatures of about 700°–800° F. and pressures up to about 1500 p.s.i. for a period of several hours, for example 2 hours, is most preferred.

The prereduced catalyst is then subjected to the coking treatment by contacting the same at temperatures ranging from about 600° F. to about 1000° F., preferably about 750° F.–900° F., with a hydrocarbon oil, preferably boiling above about 400° F. and up to about 1000° F., in the presence of a hydrogen-containing gas or an inert gas for a period of at least about 2 hours, preferably 4–24 hours. Pressure and time are not critical and coking may conveniently be performed at pressures in the range of about 0 to 700 p.s.i.g., preferably from about 200 to 400 p.s.i.g. Normally it is desirable to utilize the minimum pressure, as well as time, necessary to effectuate the coking operation. From about 2–30 weight-percent, preferably 5–15 weight-percent of non-volatile, non-benzene-extractable coke may be deposited on the catalyst.

The catalyst may be coked in the presence of hydrogen or a hydrogen-containing gas, for example process gas, or any inert (unreactive) gas, for example nitrogen, natural gas, argon, etc. Coking may be performed in the presence of hydrogen-containing recycle gas if desired, at a recycle gas rate of about 1000–5000 s.c.f./b., preferably 1000–3000 s.c.f./b. A liquid hourly space velocity ranging from about 1 to 5 may be used, it being preferable to maximize the space velocity so as to attain uniformity of coking at the top and bottom of the catalyst bed. While the hydrogen concentration in the recycle gas may range from 0 to 100%, a concentration of from 10 to 60 mole percent hydrogen, for example 20%, is preferred, the remainder being composed of inert gases.

Suitable feedstocks for coking of the catalyst include in general any of the hydrocracking feeds described hereinafter, and more generally may comprise any hydrocarbon feedstock boiling above about 150° F. Specific feeds contemplated in addition to the hydrocracking feedstocks include for example light and heavy naphthas, and the heavy bottoms fraction from naphtha reformates. Preferred feedstocks are aromatic oils containing for example at least about 25 volume-percent aromatic hydrocarbons, having a boiling range between about 400° and 1000° F. Light aliphatic hydrocarbons boiling below about 150° F. are relatively ineffective, while extremely heavy residual oils are generally to be avoided because of their metal content and very heavy asphaltenes. Best results are obtained when the unconverted feed is recycled during coking with some bleed and makeup.

The crystalline zeolite catalyst which has been subjected to the precoking treatment is further modified by effecting adsorption thereon of small amounts of ammonia and $H_2S$ during the subsequent hydrocracking operation. To achieve this result, ammonia and $H_2S$, or substances yielding ammonia and $H_2S$ may be added to the hydrocracking reactor containing the coke catalyst, for example by way of the recycle or makeup gas or with the feed oil, to yield the desired partial pressures of ammonia and $H_2S$. Any organic or inorganic sulfur compound may be used which converts to $H_2S$ under hydrocracking conditions and which has no deleterious effect on the catalyst, for example thiophene, dimethyl sulfide, carbon disulfide, mercaptans and the like. To provide ammonia, any organic or inorganic nitrogen compound which converts to ammonia under hydrocracking conditions without deleterious effect on the catalyst may be used, such as lower aliphatic amines, piperidines, etc.

Hydrocracking feedstocks which may be employed herein include in general mineral oil fractions boiling above about 300° F. and usually above about 400° F., and having an end-boiling point of up to about 1000° F., such as straight-run gas oils, coker distillate gas oils, deasphalted crude oils, and cycle oils derived from catalytic or thermal cracking. Such fractions may be derived from petroleum crude oils, shale oils, tar sand oils, coal hydrogenation products and the like. Specifically, it is preferred to employ feedstocks boiling between about 400° F. and 1050° F., having an API gravity of about 15°–35° and containing at least about 20% by volume of acid-soluble components (aromatics plus olefins). Such oils may originally contain from about 0.1% to 5% by weight of sulfur and from about 0.1% to 2% by weight of nitrogen and, prior to being hydrocracked, are preferably subjected to a hydrofining operation designed to decompose nearly all the organic sulfur, nitrogen and oxygen compounds present therein.

A hydrocracking operation suitable for practicing the invention herein will be described in connection with the attached drawing which is a flow sheet illustrating a preferred embodiment of the invention and which has been simplified by the omission of certain conventional elements, such as valves and the like.

In the drawing, fresh feed, such as cycle oil stock, is brought in through line 10 by pump 11, passed through heat exchanger 12 and is blended in line 13 with fresh and recycle hydrogen from line 38. Makeup hydrogen is brought in through line 41, passed through compressor 42 into lines 43 and 32, combined in line 35 with recycle gas fed from high-pressure separator 25 through line 33 and compressor 34, and the combined gases are passed through heat exchanger 36 and heater 37 to line 38 for blending with the fresh feed. The mixture of fresh feed and hydrogen is then passed into a hydrotreating reactor, such as hydrofiner 14, and subjected to catalytic hydrofining.

In hydrofiner 14 the feed plus hydrogen passes through catalyst beds 15, 17 and 19 and interstage quench zones 16 and 18 (injected with cool recycle hydrogen from line 39) under conditions of hydrofining. The hydrofining catalyst may comprise any of the oxides and/or sulfides of the transitional metals, and especially an oxide or sulfide of a Group VIII metal, preferably cobalt or nickel, mixed with an oxide or sulfide of a Group VI–B metal, preferably molybdenum or tungsten. Such catalysts preferably are supported on an adsorbent carrier in proportions ranging between about 2% and 25% by weight. Suitable carriers include in general the difficultly reducible inorganic oxides, e.g. alumina, silica, zirconia, titania, clays such as bauxite, bentonite, etc. Preferably the carrier should display little or no cracking activity and hence highly acidic carriers having a Cat-A cracking activity above about 20 are to be avoided. The preferred carrier is activated alumina containing about 3–15% by weight of coprecipitated silica gel.

Suitable hydrofining conditions are as follows:

|  | Broad Range | Preferred Range |
|---|---|---|
| Average Bed Temp., ° F | 600–850 | 650–750 |
| Pressure, p.s.i.g | 400–3,000 | 500–2,500 |
| LHSV, v./v./hr | 0.1–20 | 1–5 |
| Recycle gas rate, s.c.f./b | 500–15,000 | 3,000–8,000 |

Operating conditions depend on the feedstock. The above conditions should be suitably correlated so as to reduce the nitrogen content of the product to about 1–20 p.p.m., preferably below 5 p.p.m.

The effluent from hydrofiner 14 is withdrawn via line 20, passed through heat exchangers 21 and 22 and mixed with wash water introduced in line 23. The mixture is then cooled and condensed in cooler 24 and passed to high-pressure separator 25. Aqueous wash liquor containing dissolved ammonia, hydrogen sulfide, etc., is removed via line 26. Recycle hydrogen is withdrawn and recycled via line 33, as previously described. The liquid hydrocarbon phase in high-pressure separator 25 is then flashed via line 27 into low-pressure separator 28, from which lower molecular weight flash gases are withdrawn via line 98. The liquid hydrocarbons in separator 28 are withdrawn via line 29 by pump 30, passed through heat exchanger 31, combined in line 54 with recycle oil fed from fractionator 81 via line 97 by means of pump 82 and line 83, and the resulting mixture of oils is fed via lines 54 and 59 to hydrocracking reactor 46.

Low-pressure separator 28 is sufficiently depressured to drive off enough dissolved $H_2S$ to at least reduce the $H_2S$ concentration of the liquid to a level such that the desired partial pressure of $H_2S$ in the hydrocracking reactor will not be exceeded. If this is not accomplished at atmospheric pressure, it may be necessary to substitute a conventional liquid stripper (not shown) for low-pressure separator 28, to strip out the $H_2S$. With some hydrofiner feedstocks, for example those having a relatively high nitrogen content and requiring high hydrofining temperatures to convert the nitrogen, resulting in the production of substantial amounts of methane and ethane, it may be preferable to operate low-pressure separator 28 at 0–100 p.s.i.g. pressure to flash off the dissolved methane and ethane and thus preclude the same from entering the hydrocracking reactor and lowering the hydrogen concentration therein.

The foul wash water in line 26 normally goes to a stripper (not shown) to strip out the ammonium sulfide. Optionally, it may be sent to the hydrocracking stage therein as a source of ammonia and hydrogen sulfide therein by means of dotted line 40 and pump 71 to line 69. An optional source of $H_2S$ for the hydrocracking stage is also shown in dotted line 44 in the way of an $H_2S$-rich bleed stream from the recycle gas of the hydrotreating stage to the hydrocracking stage. It also contains a small amount of ammonia. As a result of the water wash of the hydrofiner effluent, no wash is generally required in the hydrocracking stage due to the low concentrations of $H_2S$ and ammonia therein. In fact, ammonia and $H_2S$, or substances yielding ammonia and $H_2S$, are normally fed to the hydrocracking stage by means of pumps 62 and 56, respectively, during the hydrocracking operation in order to replace dissolved $NH_3$ and $H_2S$ removed from the system in the liquid product condensate.

Hydrocracking reactor 46 contains a fresh commercial molecular sieve hydrocracking catalyst which has been subjected to prereduction and accelerated coking treatments as described above. For example, prereduction is accomplished with hydrogen at a pressure of about 1500 p.s.i.g., and with a controlled heat-up rate to 700° F., followed by accelerated coking for about 12 hours at a pressure of about 300 p.s.i.g., and a temperature ranging up to about 870° F. using a recycle gas containing about 20% hydrogen at a recycle gas rate of about 2100 s.c.f./b. The coking feed is a hydrofined gasoline-free recycle oil from a cracking operation, and is fed from the hydrofining system at a space velocity of about 1.5 via line 54 and dotted line 60 through heater 58 and line 59 through the catalyst in the reactor. The preferred hydrocracking catalyst comprises about 0.5% palladium ion exchanged onto a magnesium-hydrogen form of a Y molecular sieve zeolite and having an $SiO_2/Al_2O_3$ mole-ratio of 4.7 and an $MgO/Al_2O_3$ mole-ratio of 0.5, obtained commercially or prepared as described above.

During hydrocracking, the mixture of recycle oil from fractionator 81 and liquid hydrocarbons from separator 28 contained in line 54, is combined in line 59 with fresh and recycle hydrogen from lines 84 and 74, and passed under conditions of hydrocracking through catalyst bed 47, 49, 51 and 53, and interstage quench zones 48, 50 and 52 (injected with cool recycle hydrogen from line 65). $H_2S$, or an $H_2S$-yielding compound, is fed to the reactor by means of pump 56 and lines 61, 55 and 59, or alternately, it is injected into the recycle gas by means of dotted line 57 and passed through heater 58 into line 59. Ammonia, or a compound yielding ammonia, is also injected into the recycle gas by means of pump 62 and line 63. Sufficient ammonia and $H_2S$ are fed to hydrocracker 56 to attain the desired yield distribution and octane level while maintaining a low hydrogen consumption. Operative concentrations of these materials in the gas phase entering the reaction zone are as follows:

|  | $H_2S$ | | $NH_3$ | |
| --- | --- | --- | --- | --- |
|  | Broad Range | Preferred Range | Broad Range | Preferred Range |
| P.s.i. partial pressure | 0.015–0.35 | 0.045–0.2 | 0.015–15 | 0.1–0.6 |
| Volume parts per million in gas phase at 1,500 p.s.i.g | 10–233 | 30–133 | 10–10,000 | 66.6–400 |

Suitable hydrocracking conditions to be used in conjunction with the foregoing $H_2S$ and $NH_3$ concentrations are as follows:

|  | Broad Range | Preferred Range |
| --- | --- | --- |
| Average Bed Temp., °F | 600–800 | 650–775 |
| Pressure, p.s.i.g | 400–3,000 | 750–2,500 |
| LHSV, v./v./hr | 0.5–20 | 1–5 |
| Recycle gas rate, s.c.f./b | 400–15,000 | 3,000–10,000 |

The above conditions, particularly temperature and space velocity, are suitably adjusted and correlated so as to provide about 30–80 volume-percent, preferably about 40–70 volume-percent conversion per pass to 400° F. end-point products.

The effluent from hydrocracking reactor 46 is withdrawn via line 66, passed through heat exchangers 67 and 68, and sent by line 69 through cooler 70 to high pressure separator 72. The effluent may optionally be combined with foul water drawn from line 26 by pump 71 through line 40 and used as a source of ammonia, as described above. Hydrogen-rich recycle gas is withdrawn via line 74 (where it may be optionally combined with an $H_2S$-rich bleed stream from dotted line 44), passed through compressor 75, combined with makeup hydrogen from line 84, passed through heat exchanger 64 and sent through heater 58 and line 59 to hydrocracker 46. The gas may also be injected for quenching in zones 48, 50 and 52 by means of line 65, as described above. High pressure condensate in separator 72 is flashed via line 73 to low-pressure separator 76, from which light hydrocarbon gases are exhausted via line 77. Liquid condensate in separator 76 is then tarnsferred via line 78, through heat exchanger 79 and line 80 to fractionator 81.

In fractionator 81 an overhead fraction is sent via line 96 and cooler 95 through overhead separator 93 from which it may be recirculated to the fractionator via pump 91 or removed via line 92 as a light gasoline product. Light hydrocarbon gases are exhausted via line 94. A heavy gasoline product is obtained in stripper 89 and removed via line 90. Optionally, stripper 87 may be included and a mid-barrel product removed via dotted line 88, for example, a 520° F. end-point jet fuel. The oil withdrawn as bottoms is recirculated via line 85 through reboiler 86 and recycled via line 97, pump 82 and lines 83, 54 and 59 to the hydrocracking reactor.

The following examples are cited to illustrate the invention but are not to be construed as limiting the same:

Example I

In an isothermal hydrocracking pilot plant, a commercial molecular sieve hydrocracking catalyst comprising about 0.5% palladium ion exchanged onto a magnesium-hydrogen form of a Y molecular sieve zeolite having a $SiO_2/Al_2O_3$ mole-ratio of 4.7 and a $MgO/Al_2O_3$ mole-ratio of about 0.5, was prereduced by contact at 1600 p.s.i.g. in flowing hydrogen. The catalyst was heated from ambient temperature to 350° F. at a rate of 50° F./hr. and from 350°–450° F. at a rate of 40° F./hr., held at 450° F. for 6 hours, heated to 700° F. at a rate of 30° F./hr. and held at 700° F. for two hours. The catalyst was cooled to 400° F. for the start of the coking feed.

The coking feed was a hydrotreated gasoline-free gas oil having an API gravity of 31.1°, an ASTM D–86 Group 4 boiling range of 410°–618° F., an aniline point of 120° F.; and containing about 4 p.p.m. sulfur and about 2 p.p.m. total nitrogen.

Pressure was reduced to 300 p.s.i.g. Recycle gas (composed of 60 mole-percent hydrogen and 40 mole-percent $C_1$–$C_3$ gases) was started at a rate of 2500 s.c.f./b. of feed. Oil feed was introduced at a liquid hourly space velocity of 1.47 and with the catalyst initially at 400° F. The reactor was heated to 850° F. at a rate of about 50° F./hr. and held at 850° F. for 8 hours. Unconverted oil was recycled as soon as possible and fresh feed added as makeup only. The feed was then stopped and recycle gas continued at 2500 s.c.f./b. to strip the catalyst for 8 hours at 300 p.s.i.g. and 850° F. The reactor was depressured and repressured to 1500 p.s.i.g. with 100% hydrogen. Recycle gas was started at 8000 s.c.f./b. and the reactor cooled to 800° F. for an additional 8 hours of stripping. The reactor was then cooled to 400° F. and the hydrocracking feed started. After one hour the recycle oil was started to give an overall LHSV of 2.92. The reactor temperature was then raised to obtain a conversion of 60 volume-percent per pass to 400° F. endpoint products.

To test the effect of varying concentrations of $H_2S$ and ammonia, thiophene and/or tertiary butylamine were added in a number of experiments to produce the desired $H_2S$ and ammonia concentrations in the recycle gas. Table 1 summarizes the results obtained without added ammonia or $H_2S$ (or with negligible amounts) compared with runs in which a substantial amount of either ammonia or $H_2S$ was present. Table 2 summarizes the results obtained with about 200 v.p.p.m. ammonia and varying amounts of $H_2S$ in the recycle gas and the results obtained with about 100 v.p.p.m. $H_2S$ and varying amounts of ammonia in the recycle gas.

TABLE 1

|  | $H_2S$ varied, no (or negligible) $NH_3$ | | $NH_3$ varied, no (or negligible) $H_2S$ | |
|---|---|---|---|---|
| Experiment Number | 1 | 2 | 1 | 3 |
| $H_2S$ in Recycle Gas, vol. p.p.m. | <10 | 106 | <10 | <10 |
| $NH_3$ in Recycle Gas, vol. p.p.m. | 0 | 4 | 0 | 184 |
| Reactor Avg. Temp., °F | 684 | 693 | 684 | 723 |
| Yields: | | | | |
| $C_4$, vol. Percent | 30.9 | 21.8 | 30.9 | 16.9 |
| $C_5$–400° F., vol. Percent | 89.6 | 96.4 | 89.6 | 97.7 |
| Octane: | | | | |
| $C_5$–185° F. (F–1+3 ml. TEL) | 99.6 | 99.7 | 99.6 | 96.8 |
| $C_7$–400° F. (F–1+3 ml. TEL) | 91.0 | 91.5 | 91.0 | 89.2 |
| After Reforming Yield, vol. Percent | 91.2 | 101.2 | 91.2 | 100.7 |
| $H_2$ Consumption, s.c.f./b | 1,840 | 1,380 | 1,840 | 1,280 |

TABLE 2

|  | $H_2S$ varied at about 200 p.p.m. $NH_3$ | | | $NH_3$ varied at about 100 p.p.m. $H_2S$ | | | |
|---|---|---|---|---|---|---|---|
| Experiment Number | 3 | 4 | 5 | 2 | 6 | 5 | 7 |
| $H_2S$ in Recycle Gas, vol. p.p.m. | <10 | 34 | 126 | 106 | 98 | 126 | 104 |
| $NH_3$ in Recycle Gas, vol. p.p.m. | 184 | 196 | 222 | 4 | 64 | 222 | 1,165 |
| Reactor Avg. Temp., °F | 723 | 734 | 730 | 693 | 712 | 730 | 776 |
| Yields: | | | | | | | |
| $C_4$, vol. percent | 16.9 | 19.9 | 18.8 | 21.8 | 22.5 | 18.8 | 18.9 |
| $C_5$–400° F., vol. percent | 97.7 | 96.3 | 98.1 | 96.4 | 96.0 | 98.1 | 96.6 |
| Octane: | | | | | | | |
| $C_5$–185° F. (F–1+3 ml. TEL) | 96.8 | 100.0 | 99.9 | 99.7 | 99.5 | 99.9 | 99.9 |
| $C_7$–400° F. (F–1+3 ml. TEL) | 89.2 | 92.3 | 91.4 | 91.5 | 92.3 | 91.4 | 92.1 |
| After Reforming Yield, vol. percent | 100.7 | 102.2 | 103.7 | 101.2 | 101.2 | 103.7 | 103.6 |
| $H_2$ Consumption, s.c.f./b | 1,280 | 1,340 | 1,310 | 1,380 | 1,450 | 1,310 | 1,260 |

The results indicate that the addition of small amounts of both ammonia and $H_2S$ to a prereduced and coked catalyst during hydrocracking, results in substantial improvement in the yield distribution and hydrogen consumption and in the ability to maintain $C_5$–$C_6$ octane level. The gain in efficiency, as measured by the $C_5+$ yield, exceeds the incremental gain obtained with the addition of the equivalent amount of either $H_2S$ or ammonia alone, and exceeds the maximum gain obtainable with either one in even greater amounts under sweet hydrocracking condition limits (compare Experiment 1 with Experiments 2 and 3 in Table 1, and Experiments 3 and 2 with Experiments 5 and 7 in Table 2). The results also indicate that the addition of ammonia alone increases the $C_5+$ yield to a moderate extent but results in degradation of the $C_5$–$C_6$ octane level. The addition of $H_2S$ alone maintains the octane level but only moderately increases the $C_5+$ yield, whereas the addition of both ammonia and $H_2S$ results in a maximum gain in $C_5+$ yield while maintaining the $C_5$–$C_6$ octane level. (Compare Experiment 1 in Table 1 with Experiments 3 and 2, and with Experiment 5 in Table 2). In addition, the gain in "After Reforming Yield" with the addition of both ammonia and $H_2S$ is greater than the gain obtained with the addition of either ammonia or $H_2S$ alone. (Compare Experiment 1 in Table 1, with Experiments 3 and 2, and with Experiment 5 in Table 2).

Example II

To test the effect of prereduction, a molecular sieve hydrocracking catalyst similar to that used in Example I was prereduced with hydrogen at 700° F. and coked under 100 p.s.i.g. hydrogen pressure at 850° F. for 9 hours substantially as described above, except that there was no recycle of unconverted oil, resulting in overall milder coking conditions. The catalyst was then stripped with hydrogen for 6 hours at 100 p.s.i.g. followed by 16 hours at 1500 p.s.i.g., and then compared in hydrocracking activity with a portion of the same catalyst which was not prereduced prior to coking. The importance of the prereduction step is seen in the following table:

TABLE 3

| Experiment | 8 | 9 |
|---|---|---|
| Catalyst Reduced Prior to Coking | No | Yes |
| Carbon on Catalyst after Stripping, Weight-Percent | 4.0 | 4.0 |
| Hydrocracking Temp., °F | 725 | 570 |
| Volume-Percent Conversion | 35 | 48 |
| Yield of $C_7+$ Gasoline, Volume-Percent | 21 | 48 |

The prereduced catalyst was 155° F. more active (570° vs. 725° F.) than the catalyst which had been coked without prior reduction. Analysis of a sample of the less active catalyst showed that it contained a high degree of noble metal agglomeration, which caused the catalyst to deactivate rapidly during hydrocracking.

Example III

In one experiment conducted as in Example II, with prereduction, nitrogen was used, rather than hydrogen, to maintain 100 p.s.i.g. pressure during the coking step. The results show that coking can be conducted in the absence of hydrogen, and also that reduced hydrogen pressures during coking are desirable to increase coke laydown and resulting hydrocracking temperatures, as shown in Table 4:

TABLE 4

| Experiment Number | Pressure, p.s.i.g. | Carbon on Catalyst After Stripping, Weight Percent | Activity Test | | |
|---|---|---|---|---|---|
| | | | Average Reactor Temp., °F. | Conversion, Volume Percent | Yield of $C_7+$ Gasoline, Volume Percent |
| 9 | $H_2$ at 100 | 4.0 | 570 | 48 | 48 |
| 10 | $N_2$ at 100 | 5.4 | 611 | 51 | 41 |

Example IV

In another experiment conducted as in Example II, 2450 p.p.m. nitrogen as tertiary butylamine, 50 p.p.m. nitrogen as quinaldine and 100 p.p.m. sulfur as thiophene, where added to the feed during the coking step. The results, set forth in Table 5, indicate that feeds containing nitrogen and/or sulfur can also be used for coking the catalyst, but, on an equal coking severity basis, the coke derived from substantially pure feeds appears to be more effective:

TABLE 5

| Experiment Number | Nitrogen and Sulfur Added | Carbon on Catalyst After Stripping, Weight Percent | Activity test | |
|---|---|---|---|---|
| | | | Average Reactor Temp., °F. | Conversion, Volume Percent |
| 9 | No | 4.0 | 570 | 48 |
| 11 | Yes | 4.6 | 557 | 47 |

It should be noted that that hydrocracking temperatures shown in Examples III and IV are too low to achieve the high-quality products desired herein. These temperaures can however be raised 40–100° F. to the desired range above 650° F. by addition of about 300 v.p.p.m. of ammonia and 50 v.p.p.m. of hydrogen sulfide.

Example V

In a hydrofining-hydrocracking plant similar to that shown in the attached drawing a commercial molecular sieve hydrocracking catalyst of the type described in Example I was prereduced by circulating hydrogen at 1500 p.s.i.g. and heated to 700° F. in a manner similar to that described in Example I. The catalyst was then coked for 12 hours using an 870° F. reactor inlet temperature at a pressure of 225 p.s.i.g., employing recycle gas, with a hydrogen concentration ranging from 10–25 mole-percent. The coking feed was a hydrotreated oil of the type described in Example I. Oil was recycled with some bleed and makeup. The catalyst was cooled to 500° F. with oil and gas flowing. The oil was then removed and cooling of the catalyst continued to 300° F. with gas alone.

The resulting precoked catalyst was then employed for hydrocracking a hydrotreated feed having characteristics similar to the coking feed of Example I, at a pressure of 1500 p.s.i.g., a space velocity of 2.8, with a recycle gas rate of 5000 s.c.f./b., plus quench gas. Initial temperatures were in the range of 720°–730° F. with an ammonia concentration in the recycle gas of about 150 v.p.p.m. and an $H_2S$ concentration of about 50 v.p.p.m. Under these conditions the $C_5+$ yield was 99 vol.-percent (based on the raw charge to the hydrotreater), the $C_4$ yield was 18 vol.-percent, and the octane number of the $C_7+$ gasoline was 90.5 (F–1+3 ml. TEL). At the end of about 13 days ammonia injection was stopped whereupon the temperature dropped to about 700° F. and over a period of the next 9 days the $C_5+$ yield dropped to 96 vol.-percent and the $C_4$ yield increased to 21.5 vol.-percent while the octane of the $C_7+$ remained essentially constant. At the end of 36 days ammonia injection was restored and the $C_5+$ yield increased to 98 vol.-percent, the butane yield dropped to 19 vol.-percent and the $C_7+$ octane was 91.5 (F–1+3 ml. TEL). For the next 50 days of operation, reactor temperatures, yields and product quality remained substantially constant showing essentially no catalyst deactivation.

It is intended that the following claims define the true scope of the invention, which invention is not limited to the details described above:

We claim:
1. A process for the catalytic hydrocracking of a mineral oil feedstock to produce high yields of high quality gasoline, which comprises:
   (1) passing a stream of said feedstock plus added hydrogen through a bed of a partially deactivated Group VIII noble metal-promoted zeolite hydrocracking catalyst in a hydrocracking zone maintained at an elevated pressure and at a hydrocracking temperature between about 600° and 800° F.;
   (2) maintaining in the total vapor phase feed to said hydrocracking zone, by the substantially continuous addition thereto of sulfur and nitrogen compounds, a hydrogen sulfide partial pressure between about 0.015 and 0.35 p.s.i. and an ammonia partial pressure between about 0.015 and 15 p.s.i. to thereby improve gasoline yields and octane values as compared to the yield-octane values which would be obtained in the absence of either the hydrogen sulfide or the ammonia;
   (3) said hydrocracking catalyst having been partially deactivated by previous contact with a hydrocarbon feedstock at elevated temperatures to deposit a minor proportion of non-volatile coke thereon; and
   (4) recovering high-octane gasoline from the product effluent from said hydrocracking zone.

2. A process as defined in claim 1 wherein said hydrocracking temperature is between about 650° and 775° F.

3. A process as defined in claim 1 wherein said hydrocracking zone is maintained at a pressure between about 750 and 2500 p.s.i.g., and wherein said partial deactivation step (3) is carried out at a pressure between about 0 and 700 p.s.i.g.

4. A process as defined in claim 1 wherein said hydrogen sulfide partial pressure is between about 0.045 and 0.2 p.s.i., and said ammonia partial pressure is between about 0.1 and 0.6 p.s.i.

5. A process as defined in claim 1 wherein said catalyst comprises a Y zeolite wherein the zeolitic cations are mainly hydrogen ions and/or polyvalent metal ions.

6. A process as defined in claim 1 wherein said Group VIII noble metal is palladium.

7. A process as defined in claim 1 wherein said hydrocracking catalyst is prereduced with hydrogen at an elevated temperature prior to said partial deactivation step (3).

8. A process for the catalytic hydrocracking of a mineral oil feedstock to produce high yields of high quality gasoline, which comprises:
(1) passing a stream of said feedstock plus added hydrogen through a bed of a partially deactivated Group VIII noble metal-promoted zeolite hydrocracking catalyst in a hydrocracking zone maintained at a pressure between about 750 and 2500 p.s.i.g. and at a hydrocracking temperature between about 600° and 800° F., said catalyst having been previously calcined, reduced and partially deactivated by the steps of:
  (a) calcining the ammonium form of said catalyst in air at about 700°–1300° F. to effect dehydration thereof and conversion of zeolitic ammonium ions to hydrogen ions;
  (b) subjecting the resulting oxidized hydrogen zeolite catalyst to reduction with hydrogen at elevated temperatures to convert the oxidized noble metal component to free metal; and
  (c) subjecting the reduced catalyst to partial deactivation by contacting the same with a hydrocarbon oil at elevated coking temperatures of about 600°–1000° F. and at a pressure between about 0 and 700 p.s.i.g. to deposit thereon a minor proportion of non-volatile coke;
(2) maintaining in the total vapor phase feed to said hydrocracking zone, by the substantially continuous addition thereto of sulfur and nitrogen compounds, a hydrogen sulfide partial pressure between about 0.015 and 0.35 p.s.i. and an ammonia partial pressure between about 0.015 and 15 p.s.i., to thereby improve gasoline yields and octane values as compared to the yield-octane values which would be obtained in the absence of either the hydrogen sulfide or the ammonia; and
(3) recovering high-octane gasoline from the product effluent from said hydrocracking zone.

9. A method as defined in claim 8 wherein step (c) is carried out at about 750–900° F. and at a pressure below about 400 p.s.i.g.

10. A process as defined in claim 8 wherein said hydrocracking temperature is between about 650° and 775° F.

11. A process as defined in claim 8 wherein said hydrogen sulfide partial pressure is between about 0.045 and 0.2 p.s.i., and said ammonia partial pressure is between about 0.1 and 0.6 p.s.i.

12. A process as defined in claim 8 wherein said catalyst comprises a Y zeolite wherein the zeolitic cations are mainly hydrogen ions and/or polyvalent metal ions.

13. A process as defined in claim 8 wherein said Group VIII noble metal is palladium.

14. In a catalytic hydrocracking process wherein a substantially sulfur- and nitrogen-free mineral oil feedstock is converted to gasoline in a hydrocracking zone at elevated temperatures and pressures in the presence of added hydrogen and a partially coke-deactivated Group VIII noble metal-promoted zeolite hydrocracking catalyst, the improved method for improving gasoline yields, which comprises substantially continuously adding to said hydrocracking zone both a hydrogen sulfide-yielding sulfur compound and an ammonia-yielding nitrogen compound, so as to maintain therein higher partial pressures of hydrogen sulfide and ammonia than would be generated by the sulfur and nitrogen compounds present in said feedstock.

References Cited
UNITED STATES PATENTS

| | | | |
|---|---|---|---|
| 2,120,295 | 6/1938 | Pier et al. | 208—108 |
| 2,959,534 | 11/1960 | Fogle | 208—59 |
| 3,132,090 | 5/1964 | Helfrey et al. | 208—111 |
| 3,140,253 | 7/1964 | Plank et al. | 208—120 |
| 3,278,416 | 10/1966 | Dwyer et al. | 208—87 |

DELBERT E. GANTZ, *Primary Examiner.*

ABRAHAM RIMENS, *Assistant Examiner.*